United States Patent
Staczek

[19]

[11] Patent Number: 5,934,414
[45] Date of Patent: Aug. 10, 1999

[54] LIFTING APPARATUS

[76] Inventor: James J. Staczek, 417 Forest, Rossford, Ohio 43460

[21] Appl. No.: 09/004,031

[22] Filed: Jan. 7, 1998

[51] Int. Cl.⁶ .................................................... B66B 9/02
[52] U.S. Cl. ...................... 187/269; 187/273; 254/93 HP
[58] Field of Search ................................ 187/211, 269, 187/272, 273; 254/89 H, 93 HP, 93 R

[56] References Cited

U.S. PATENT DOCUMENTS

| | | | |
|---|---|---|---|
| 2,625,443 | 1/1953 | Sensenbaugh | 304/29 |
| 3,174,722 | 3/1965 | Alm | 254/93 |
| 3,920,096 | 11/1975 | Fisher | 182/63 |
| 3,983,960 | 10/1976 | Sikli | 187/18 |
| 4,113,065 | 9/1978 | Sikli | 187/18 |
| 4,319,666 | 3/1982 | Hunter | 187/43 |
| 4,323,141 | 4/1982 | Ragan et al. | 187/8.47 |
| 4,403,680 | 9/1983 | Hillesheimer | 187/18 |
| 4,688,760 | 8/1987 | Garman et al. | 254/93 HP |
| 4,921,074 | 5/1990 | Ochs | 187/8.71 |
| 5,096,160 | 3/1992 | Calico et al. | 254/93 HP |
| 5,299,906 | 4/1994 | Stone | 414/792.3 |
| 5,394,959 | 3/1995 | Cullity et al. | 187/249 |
| 5,419,534 | 5/1995 | Vesely | 254/9 C |
| 5,454,625 | 10/1995 | Christensen et al. | 298/18 |
| 5,460,460 | 10/1995 | Alexander | 14/71.3 |
| 5,506,012 | 4/1996 | Wright et al. | 428/35.2 |
| 5,525,019 | 6/1996 | Moore et al. | 414/347 |
| 5,542,500 | 8/1996 | Emrey | 187/273 |
| 5,542,806 | 8/1996 | Kang | 414/422 |

OTHER PUBLICATIONS

OMNI Literature; pp. 1–4; Dec. 23, 1997.

*Primary Examiner*—Kenneth W. Noland
*Attorney, Agent, or Firm*—Marshall & Melhorn

[57] ABSTRACT

A lifting apparatus including a base, a load platform, a vertically expandable actuator linkage mechanically coupled between said load platform and said base, and a glycol operated actuator chamber having a compressible bellows. Means are provided for mechanically coupling the compressible bellows between the base or platform and the linkage. This provides an extremely stable platform, and one which remains rock solid once it is set in position, because glycol is a non-compressible fluid and is not affected by normal temperature variations found in industrial settings.

26 Claims, 5 Drawing Sheets

LIFTING APPARATUS

BACKGROUND OF THE INVENTION

1. Field of the Invention

The present invention relates to a lifting apparatus. More particularly, the present invention relates to a lifting apparatus which can maintain the top of a load platform at a constant height regardless of the change in load or temperature. Most particularly, the present apparatus relates to a lifting device which utilizes a glycol fluid to maintain a load platform at a specific height. Since the load platform is maintained at a specific height in a particularly stable condition by the use of glycol, with hydraulic circuitry and components combined with compressed air as an energy source, the invention is very useful for workers who need to be located at the optimum position for the job they are performing.

2. Description of the Prior Art

There are a number of known load platforms in the art which will maintain people or objects in a sitting or standing position for various specific reasons.

An example of such a device is that disclosed in U.S. Pat. No. 4,319,666 to Hunter. Hunter discloses a service jack to be mounted on a vehicle lift track for movement into desired places along the runways of the lift rack. The service jack includes a carriage suspended between the runways, an elongated vehicle lifting jack assembly operateably supported by the carriage for vertical movement toward and away from the member supported on the runways, a fluid pressure lifting member between the carriage and the vehicle's lifting jack assembly, releasable safety device responsive to raising of the vehicle lifting jack assembly for preventing accidental reverse movement thereof, and devices for guiding and maintaining the vehicle jack assembly in a substantially level attitude in all positions.

U.S. Pat. No. 4,688,760, entitled Lifting Apparatus, issued to Garman et al., shows a lifting apparatus including a base, a platform disposed above the base, a thrust device therebetween to lift the platform relative to the base, and a platform stabilizer enclosed within the thrust device to connect the platform and base in parallel. The platform stabilizer includes an upper extensible linkage device having upper end portions connected to the platform, a lower extensible linkage device having lower end portions connected to the base, and a connecting arrangement connecting lower end portions of the upper extensible linkage device to upper end portions of the lower extensible linkage device so that the linkage devices are constrained to move in unison. The thrust means is preferably pneumatically inflatable to apply lifting forces directly to the platform independently of the platform stabilizing means.

U.S. Pat. No. 5,299,906, entitled Self Adjusting Pneumatic Load Elevator, issued to Robert M. Stone shows a self adjusting load elevator having a base, a horizontal load platform, a vertically expandable scissors linkage coupled between the load platform and the base, and an air actuator chamber. The air actuator chamber is formed of a compressible bellows and a fixed volume reservoir. The bellows is compressible between specified maximum and minimum bellows heights which correspondingly determine the substantially different maximum and minimum bellows volumes, and coupled between scissored linkage and the load platform. The air reservoir is coupled to the bellows and has a fixed volume that is substantial compared to the difference between the maximum and minimum bellows volumes. A normally closed air inlet/outlet valve is coupled to the air actuator.

The three examples listed above are all pneumatically operated. It has been found that pneumatic operation is not satisfactory for a worker standing on a work platform because of the "springingness" of the platform. Further, pneumatically only operated devices are subject to some effect because of wide temperature swings, and may need to be constantly adjusted.

Hydraulically operated lifting platforms are also known and could be satisfactory, but hydraulic fluid is not viewed as environmentally acceptable in work areas, and require a source of energy, normally electrical, to operate.

Therefore those skilled in the art of lifting devices continue to search for a satisfactory solution of how to provide a stable platform for a worker which would not have springy feel, not be affected by temperature variations, and utilize low pressure compressed air as an energy source.

SUMMARY OF THE INVENTION

A lifting apparatus including a base, a load platform, a vertically expandable actuator linkage mechanically coupled between said load platform and said base, and a glycol operated actuator chamber having a compressible bellows. Means are provided for mechanically coupling the compressible bellows between the base or platform and the linkage. This provides an extremely stable platform, and one which remains rock solid once it is set in position, because glycol is a non-compressible fluid and is not affected by normal temperature variations found in industrial settings.

In one embodiment of the present invention, a lifting apparatus is provided having a base, a load platform, and a vertically expandable actuator linkage mechanically coupled between the load platform and the base. A glycol operated compressible bellows is mechanically coupled between the base and the linkage such that the bellows operates the actuator linkage in response to glycol being introduced into, or removed from, the compressible bellows. A means to supply glycol under pressure to said glycol operated actuator chamber is provided, as is a means to control the means to supply glycol.

In another embodiment of the present invention, a lifting apparatus is provided having a base, a load platform and a vertically expandable actuator linkage mechanically coupled between the load platform and the base. A glycol operated compressible bellows is mechanically coupled between the load platform and the linkage such that the bellows operates the actuator linkage in response to glycol being introduced into, or removed from, the compressible bellows. A means to supply glycol under pressure to the compressible bellows is supplied, as is a means to control the means to supply glycol under pressure.

In yet another embodiment of the present invention there is provided a lifting apparatus having a base, a load platform, a scissors linkage mechanically coupled between the load platform and the base, and a glycol operated actuator chamber mechanically coupled between the base and the linkage to raise and lower said load platform. An air-glycol piston accumulator is connected to the glycol operated bellows and a source of air is connected through a suitable valve means to the air side of said air-glycol piston accumulator.

It is an object of the present invention to provide a lifting apparatus operable in an environmentally safe manner.

A further object is to provide a lifting apparatus having an extremely stable platform.

A still further object of the present invention is to provide a lifting apparatus having a single-line connection to a source of power.

Further objects and advantages of the present invention will be apparent from the following description and appended claims, referenced being made to the accompanying drawings forming a part of the specification, wherein like referenced characters designate corresponding parts in the several views.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purpose of description, and not of limitation.

DESCRIPTION OF THE PREFERRED EMBODIMENTS

Figure 1:
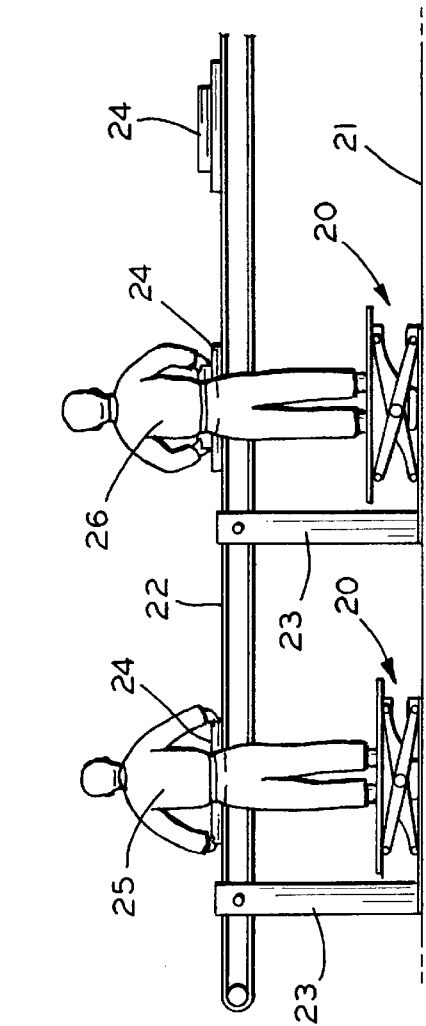
FIG. 1 is an elevational view showing a pair of lifting devices embodying the construction of the present invention used adjacent a work surface to have workers of different heights at the optimum work height.

Referring now to FIG. 1, there is shown a plurality of lifting apparatus, generally designated by the numeral 20, placed on a floor or supporting surface 21. Floor 21 also supports a work table or work area 22 supported by a plurality of vertical supports 23. A plurality of work pieces 24 are supported on work surface or table 22. Work surface or table 22 may be stationary, be of a conveyor type, or of any type work surface known in the art.

It will be noted that first worker 25 is of smaller stature than second worker 26. However, because of the adjustability of their respective lifting apparatus 20, they are both positioned at the optimum height with respect to the work surface 22 for performing their job.

Figure 2:
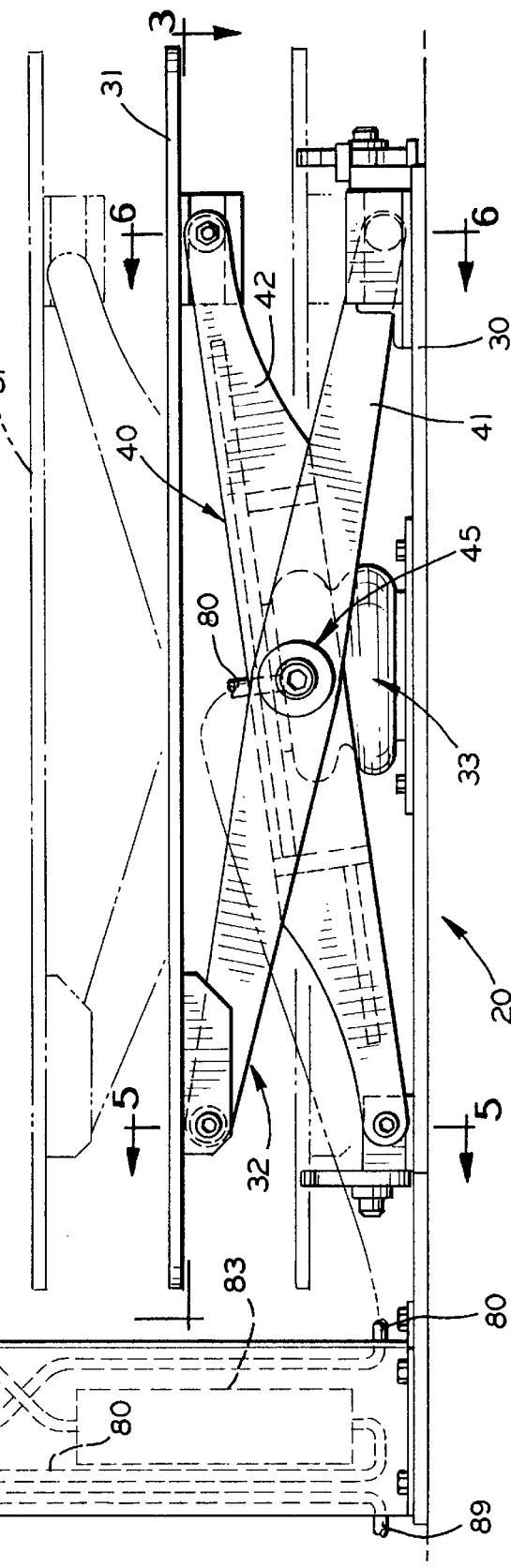
FIG. 2 is an elevational view on an enlarged scale of the construction of the lifting device shown in FIG. 1.

Referring now to FIG. 2, there is shown lifting apparatus 20, having a base 30 and a load platform 31. Connecting the base 20 and load platform 21 is a vertically expandable actuator linkage generally designated by the numeral 32. Connected between the base 20 and the vertically expandable actuator linkage 32, or between the load platform 31 and the vertically expandable actuator linkage 32, is a glycol operated actuator chamber, generally designated by the numeral 33. A control pedestal 36 is fixedly mounted to the base 30, and contains the means to supply glycol under pressure to the glycol operated actuator chamber, and the means to control the means to supply, to be described hereinafter. Control lever 37 enables the worker or operator to position the load platform 31 at any desired position.

Figure 3:
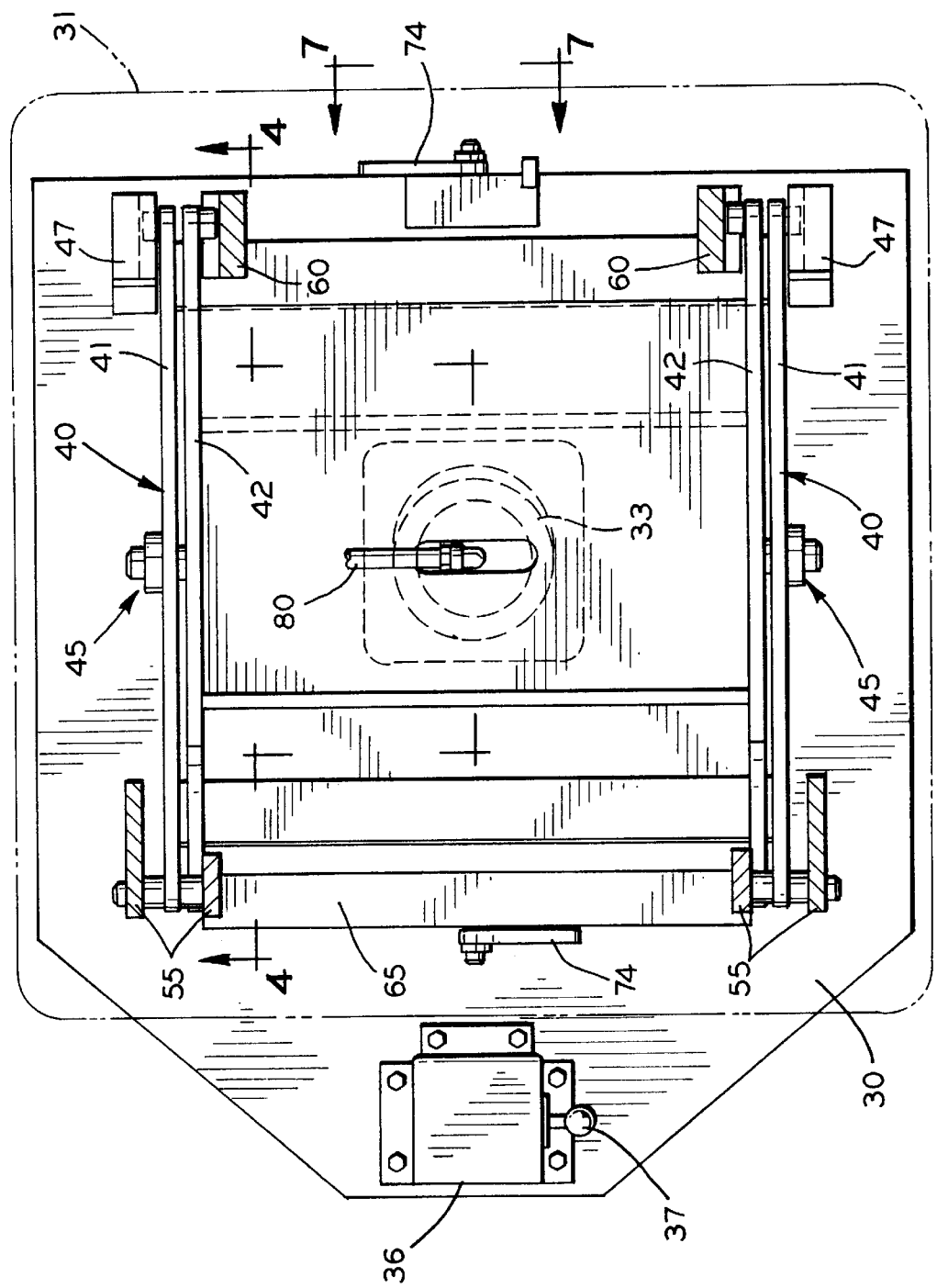
FIG. 3 is a sectional view, taken in the direction of the arrows, along the section line 3—3 of FIG. 2, essentially showing the construction of the present invention with the load platform removed.
Figure 4:
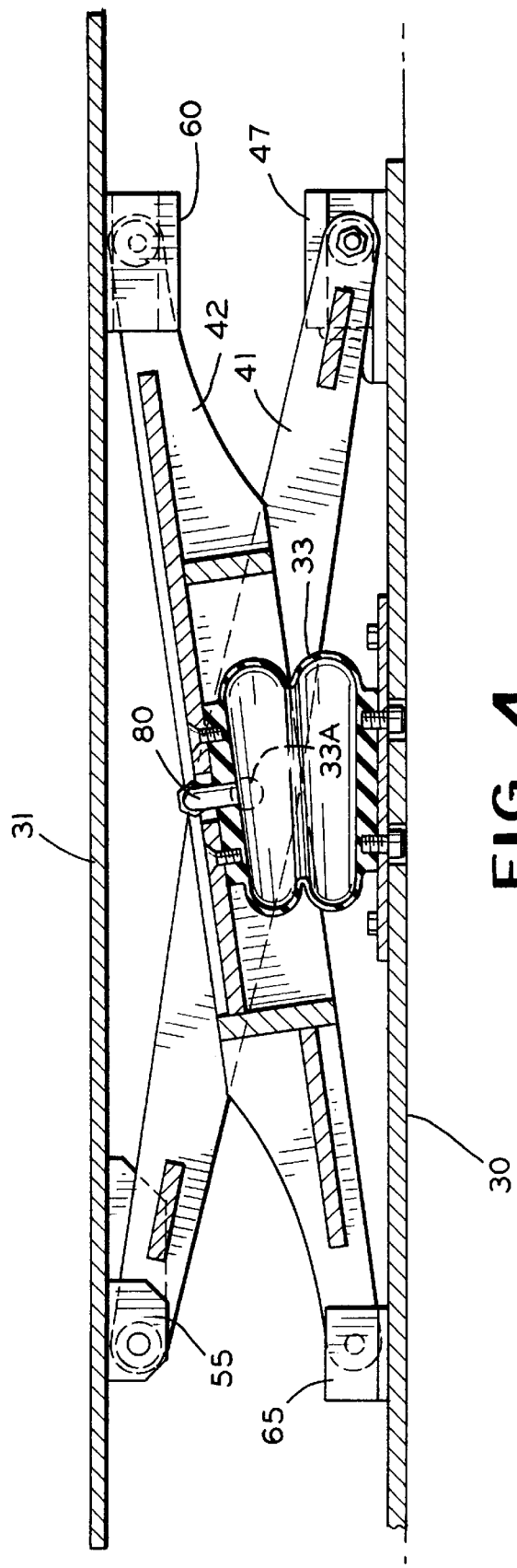
FIG. 4 is a sectional view, taken in the direction of the arrows, along the section line 4—4 of FIG. 3.

Referring now to FIG. 3, which is top plan view of the lifting apparatus 20, with the load platform 31 removed, it can be seen that the vertically expandable actuator linkage comprises a pair of scissor linkages 40, secured to base 30. Each scissors linkage comprises an outer linkage 41, pivotally and slidably connected at its lower end to base 30 in a manner to be described, and an inner linkage 42 pivotally and slidably connected at its upper end to said load platform 31, with said outer linkage 41 and inner linkage 42 connected by a median pivot means 45.

Referring to FIGS. 2–6, the lower end of each outer linkage 41, which forms part of scissor linkage 40, is pivotally and slidably connected at its lower end to said base 30, by way of first roller guide 47, mounted to base 30 by fastening means such as shoulder screw 48. A roller guide shim 49 may be used as desired. First roller guide 47 constrains cam follower 50 to move in track 51 formed in the first roller guide 47. Cam follower 50 is rotatably mounted to the lower end of outer linkage 41 by use of jam nut 53. A lock washer (not shown) may be interposed between outer linkage 41 and jam nut 53, if desired.

The upper end of each outer linkage 41 is fixedly pivotally connected at its upper end to said load platform. This is accomplished by attaching a pair of platform brackets 55, having apertures 55A therein, in a down-standing manner to load platform 31 in a parallel spaced relationship. A pair of spacers 56, having apertures 56A therein, is provided on each side of outer linkage 41. First shoulder screw 57 is inserted through bracket 55, spacer 56, aperture 41A provided in outer linkage 41, another spacer 56, and then threaded into a threaded portion of bracket 55, in a manner well known in the art to fixedly, but pivotally, mount the upper end of outer linkage 41 to the bottom of platform 31.

Figure 5:
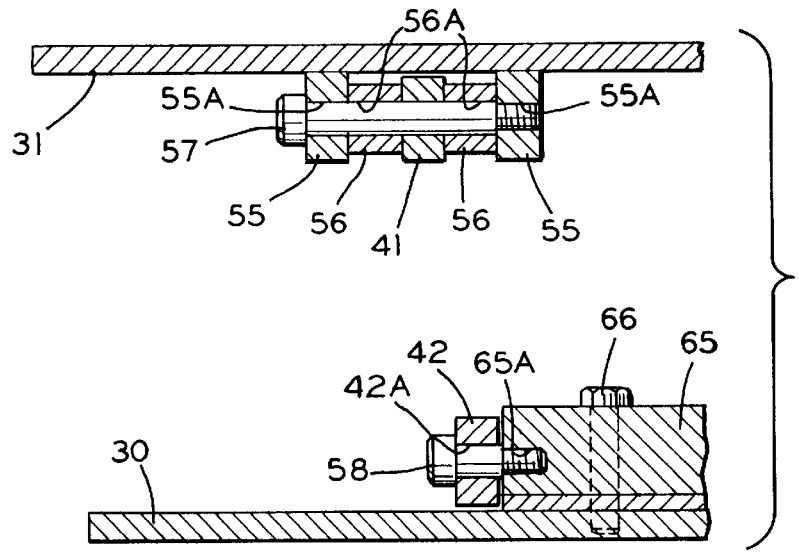
FIG. 5 is a sectional view, taken in the direction of the arrows, along the section line 5—5 of FIG. 2.
Figure 6:
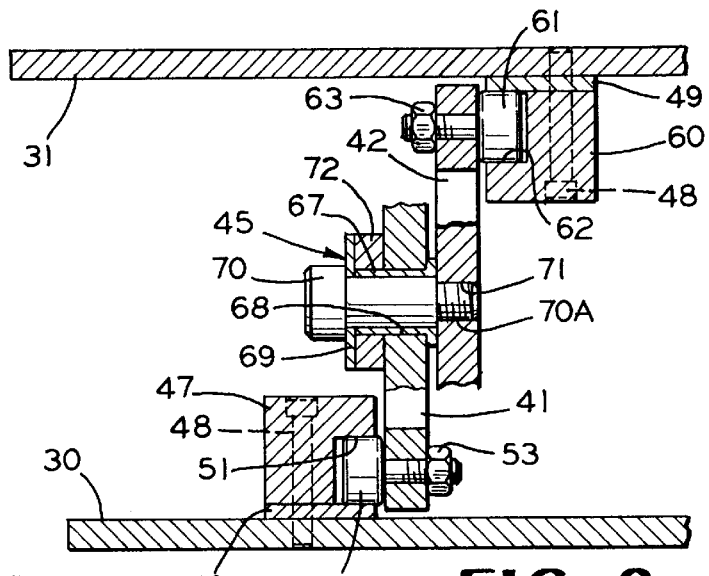
FIG. 6 is a sectional view, taken in the direction of the arrows, along the section line 6—6 of FIG. 2.

Inner linkage 42 of scissor linkage 40 is mounted to the base 30 and platform 31 in a somewhat similar manner, but it is slidably connected at its upper end and pivotally connected at its lower end. Referring to FIGS. 5 and 6, the upper end of inner linkage 42 is attached to the platform 31 by a second roller guide 60 attached to the platform 31 by a fastening means such as cap screw 48. A roller guide shim 49 may be used if necessary. A second cam follower 61 is constrained for movement along second track 62 contained in second roller guide 60. Cam follower 61 is fixedly but rotatably attached to the upper end of inner linkage 42 by a second jam nut 63. As before, a lock washer may be provided if desired.

The lower end of inner linkage 42 is fixedly but rotatably attached to the base 30 by attaching a mounting bar 65 to the base 30 with a fastening means, such as a cap screw 66. Second cap screw 58 is passed through aperture 42A adjacent the end 42 of the inner linkage and screwed into the threaded aperture 65A found in the mounting bar.

It can be understood by those skilled in the art that the mounting bars, platform brackets and first and second roller guides described herein can be attached to the platform or base by any means well known in the art, such as by welding, brazing, rivets and the like, in addition to using screws.

Inner linkage 42 is rotatably connected to outer linkage 41 by median pivot means 45. Median pivot means 45 includes a suitable bearing means 67, inserted into an aperture 68 provided in outer linkage 41. To provide for a longer bearing surface, spacer 72 is provided. Washer 69 abuts the end of the bearing means 67, while fastening means, such as third shoulder screw 70, will have a sliding fit with bearing means 67 and will be retained by threaded portion 70A entering a mating threaded portion 71 of inner linkage 42.

Figure 7:
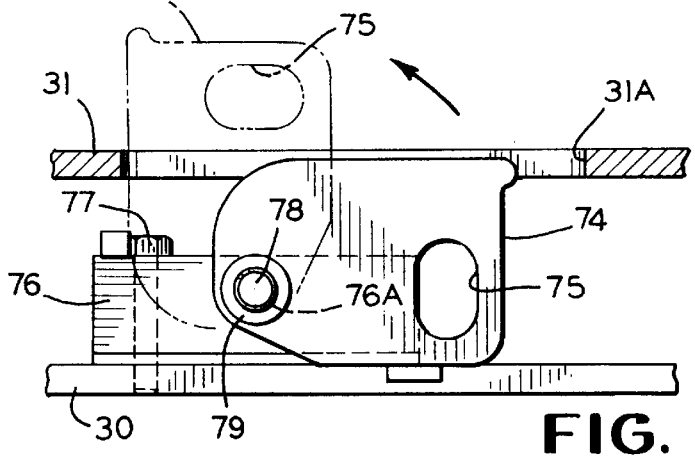
FIG. 7 is a sectional view, taken in the direction of the arrows, along the section line 7—7 of FIG. 3.

Referring now to FIGS. 3 and 7, there is a rotatable pick-up handle 74, mounted at opposite ends of the base 30, for lifting the lifting apparatus 20, when it needs to be moved from one location to another location on the shop floor.

The dimensions of each rotatable pick-up handle are chosen so that when in its rotated position, shown in FIG. 7, it will not extend above the platform 31.

Although not seen in FIG. 3 because the platform is removed, in its extended position, and with the platform 31 in its lowest position, the pick-up handle 74 may by rotated through a slot 31A in platform 31, such that hole 75 extends above the platform 31 and suitable lifting apparatus may be attached.

The rotatable pick-up handle 74 is fixedly attached to the base 30 by means of a pick-up handle mounting bar 76, which is mounted to the base by any of many well-known methods in the art, such as by using a mounting bar fastening means 77 to attach the pick-up handle mounting bar 76 to the base 30.

Rotation for the rotatable pick-up handle 74 is provided by having a threaded portion 76A provided in a predetermined desired position on the mounting bar 76. A fastening means, such as set screw 78 used in combination with flat washer 79, securely attaches the rotatable pick-up handle 74 to each end of the lifting apparatus 20.

Figure 8:
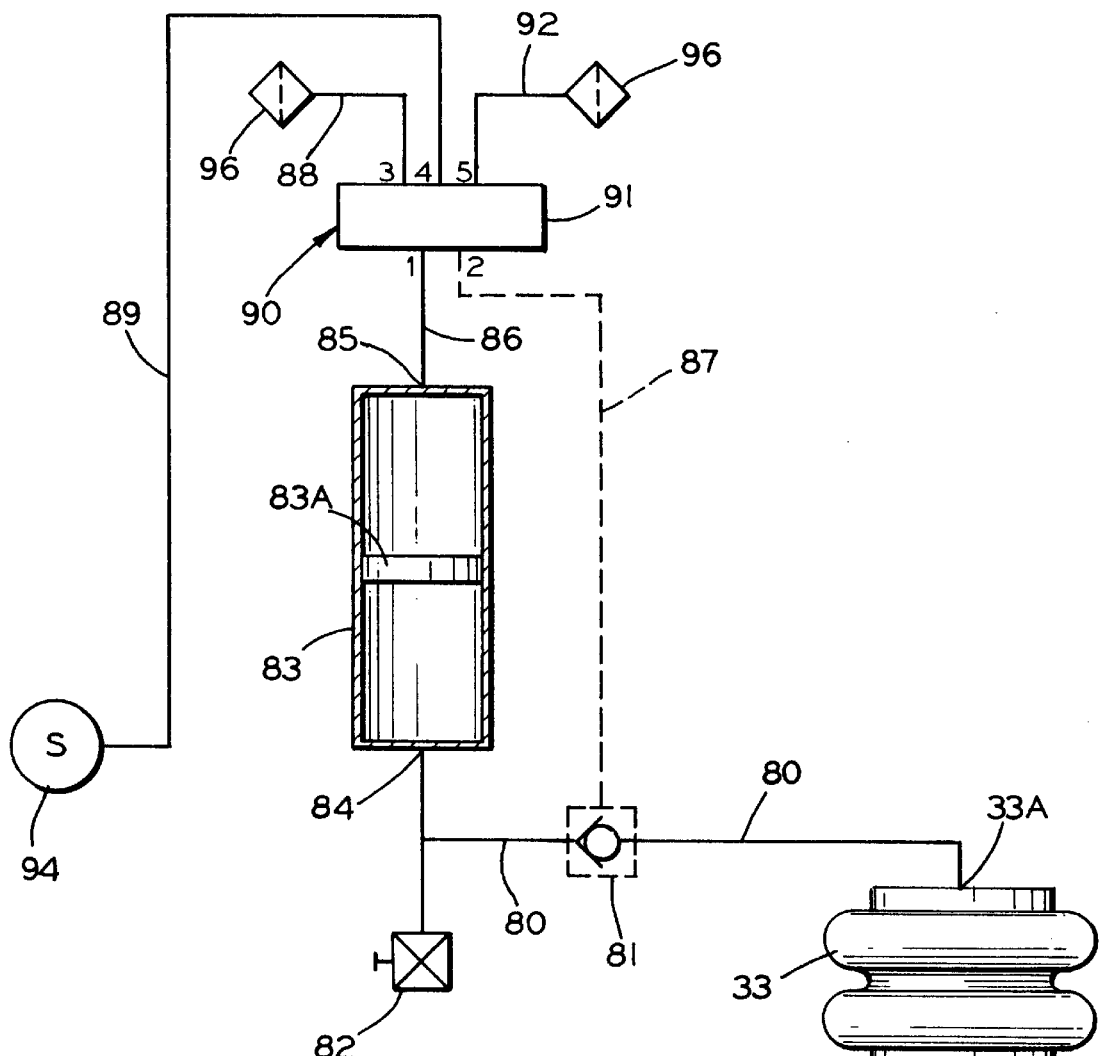
FIG. 8 is a schematic diagram of the control means and pressure supply means of the present invention.
Figure 8A:
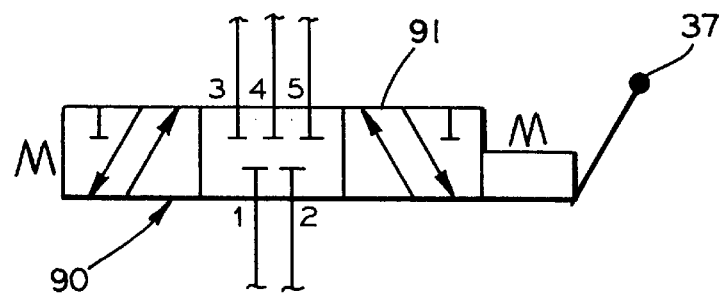

Referring now to FIG. 8, there is shown a schematic diagram of the means to supply glycol under pressure to the glycol operated actuator chamber 33, and a means to control said means to supply.

Connected to the inlet 33A of the glycol operated actuator chamber 33, is a glycol conduit 80. The other end of the glycol conduit 80 is connected to the inlet 84 of the air-glycol piston accumulator 83. Interposed seriatim in the glycol conduit 80 between the glycol operated actuated chamber 33, and the air-glycol piston accumulator 83 is a pilot operated check valve 81 and a bleed valve 82. In combination, the air-glycol piston accumulator 83, the bleed valve 82, the pilot operated check valve 81, and the glycol conduit 80 connecting these devices, form the preferred means to supply glycol under pressure to the glycol operated actuator chamber.

To control the air-glycol piston accumulator 83, there is connected to the outlet thereof 85, a first air conduit 86, which is connected to valve means 90. Many types of valve arrangements known in the art could control the air-glycol piston accumulator 83 and be well within the scope of the present invention. In the preferred embodiment, a three position, four way, five ported, closed center, spring-centered valve 91 is chosen to be the valve means 90. Connected to the first port of the four-way valve 91 is a first air-conduit 86 which, as just described, is connected to the inlet or air side 85 of the air-glycol piston accumulator. The second port of the four ported valve 91, is connected by the way of a signal line 87, to the pilot operated check valve 81. The third port of the four-way valve 91 is connected to a silencer 96, by way of third air-conduit 88. The fourth port of said four-way valve is connected by a fourth conduit 89 to a source of air under pressure, indicated by the numeral 94. Such source of air may be any of those well-known in the art such as compressor, a shop air line, an air tank, a reservoir, or the like, and such is well within the scope of the present invention.

The fifth port of the four-way valve 91 is connected by way of fifth air conduit 92 to another silencer 96.

In operation, since the three position four way five ported valve 91 is spring centered, even if there is a volume of pressurized air coming from air source 94 through fourth air conduit 89 nothing will happen. Nothing will happen even though the worker or operator steps on the load platform 31, which would put pressure on the air glycol accumulator chamber, because glycol can not leave the air glycol accumulator through glycol conduit 80 because it is blocked from doing so by pilot operated check valve 81.

For purposes of example, let us now assume that an operator does step on load platform 31 and wishes to raise the load platform. The operator will raise the control lever 37 mounted on control pedestal 36 and this will cause air from the source of air 94 to move through fourth air conduit into port four of the four way valve 91. In this case, air will enter at port four and exit at port one traveling through the first air conduit 86 into the inlet 85 of the air glycol piston accumulator, causing the free floating piston 83A to move in a first direction and compress the glycol above the piston. Since glycol is a non-compressible fluid, this means that some of the glycol above the piston 83A will leave the piston accumulator and travel through the glycol conduit 80 past the pilot operated check valve 81 and enter the inlet 33A of the glycol operated actuator chamber 33. Since the glycol operated actuator chamber is a bellows, it will expand, applying upward pressure to the scissors linkages 40 forming the vertically expandable actuator linkage 32 which is attached between the base 30 and the load platform 31, thereby causing the load platform 31 to elevate. This will occur as long as the operator holds the control lever 37 in a raised position. Once the operator releases pressure on the control lever 37 it will return to its spring centered position.

At the end of the day, or whenever the worker feels the desire to, he may wish to lower the platform 31 slightly to change his working position, or may want to retract it entirely to leave the job site. In order to do this he needs to put downward pressure on the four way spring centered valve 91. This will cause air from the source 94 to travel through the body of the four way valve 91, into the signal line 87, to open the pilot operated check valve. This allows fluid inside the glycol operated actuator chamber 33 to leave through inlet 33A and travel through the glycol conduit 80 to the outlet 84 of air glycol piston accumulator and into the space above the center piston 83A. This will cause center piston 83A to move toward the inlet 85 causing air to exit from the air glycol accumulator travel through first air conduit 86, the body of the four position valve 91, and out port five through the fifth air conduit 92 and out the silencer 96. This will continue as long as the operator inserts downward pressure on the lever 37 mounted in the control pedestal 36.

Once pressure is released, the three position four way five ported, closed center, spring centered valve 91 will return to its spring centered position and all fluid flow in the system will stop. The valve means 90 the first through fifth air conduits 86, 87, 88, 89 and 92 together with the silencers 96 and the source of air 94 form the means to control the means to supply glycol under pressure to said glycol operated actuator chamber.

Thus, by carefully studying the problems present in the prior art lifting devices, I have invented a novel stable and environmentally safe lifting apparatus.

What is claimed is:

1. A lifting apparatus including, in combination:
 a) a base;
 b) a load platform;

c) a vertically expandable actuator linkage mechanically coupled between said load platform and said base, and;

d) a glycol operated actuator chamber comprising:
  i) a compressible bellows,
  ii) means for mechanically coupling said compressible bellows between said base and said linkage such that said bellows is adapted to operate said actuator linkage in response to glycol being introduced into said compressible bellows.

2. The apparatus defined in claim 1, and further including:
a) means to supply glycol under pressure to said glycol operated actuator chamber, and;
b) means to control said means to supply.

3. The apparatus defined in claim 2, wherein said means to supply glycol under pressure include:
a) an air-glycol piston accumulator having an inlet and an outlet,
b) a first conduit connecting the outlet of said air-glycol piston accumulator to said glycol operated actuator chamber,
c) a pilot operated check valve interposed in said first conduit between said glycol operated actuator chamber and said air-glycol piston accumulator.

4. The apparatus defined in claim 3, wherein said means to supply glycol under pressure further includes:
a) a bleed valve interposed in said first conduit between said pilot operated check valve and said air-glycol piston accumulator.

5. The apparatus defined in claim 4, wherein said means to control said means to supply includes:
a) a three position, four way, five ported, closed center, spring centered valve in fluid communication with the inlet of said air-glycol piston accumulator and a source of pressurized air.

6. The apparatus defined in claim 5, wherein one port of said a three position, four way, five ported, closed center, spring centered valve is connected to said inlet of said air-glycol piston accumulator, another of said ports is in fluid communication with said pilot operated check valve, another of said ports is in fluid communication with a silencer, another of said ports is in fluid communication with a source of pressurized air, and the remaining port is in fluid communication with a second silencer.

7. The device defined in claim 6, wherein said base has a control pedestal mounted thereto, and said control pedestal has said three position, four way, five ported, closed center, spring centered valve mounted thereto.

8. The device defined in claim 1, wherein said expandable actuator linkage comprised a pair of scissor linkages connected at a median pivot point.

9. The device defined in claim 8, wherein each of said pair of scissor linkages includes:
a) an outer linkage pivotally and slidably connected at its lower end to said base, and fixedly and pivotally connected at its upper end to said load platform, and
b) an inner linkage pivotally and slidably connected at its upper end to said platform, and fixedly and pivotally connected at its lower end to said base, said inner linkage connected to said outer linkage by a median pivot means.

10. The device defined in claim 9, and further including:
a) a roller guide fixedly mounted to said base, and
b) a cam follower rotatably mounted to the lower end of said outer linkage and constrained for movement in said roller guide.

11. The device defined in claim 10, and further including:
a) a roller guide fixedly mounted to said platform, and
b) a cam follower rotatably mounted to the upper end of said inner linkage and constrained for movement in said roller guide.

12. The device defined in claim 11, and further including:
a) an actuator linkage mounting block fixedly mounted to said platform, and
b) a fixed pivot means connecting said upper end of said outer linkage to said actuator linkage mounting block.

13. The device defined in claim 11, and further including:
a) an actuator linkage mounting block fixedly mounted to said base, and
b) a fixed pivot means connecting said lower end of said inner linkage to said actuator linkage mounting block.

14. A lifting apparatus including, in combination:
a) a base;
b) a load platform;
c) a vertically expandable actuator linkage mechanically coupled between said load platform and said base, and;
d) a glycol operated actuator chamber comprising:
  i) a compressible bellows,
  ii) means for mechanically coupling said compressible bellows between said load platform and said linkage such that said bellows is adapted to operate said actuator linkage in response to glycol being introduced into said compressible bellows.

15. The apparatus defined in claim 14, and further including:
a) means to supply glycol under pressure to said glycol operated actuator chamber, and;
b) means to control said means to supply.

16. The apparatus defined in claim 15, wherein said means to supply glycol under pressure include:
a) an air-glycol piston accumulator having an inlet and an outlet,
b) a first conduit connecting the outlet of said air-glycol piston accumulator to said glycol operated actuator chamber,
c) a pilot operated check valve interposed in said first conduit between said glycol operated actuator chamber and said air-glycol piston accumulator.

17. The apparatus defined in claim 16, wherein said means to supply glycol under pressure further includes:
a) a bleed valve interposed in said first conduit between said pilot operated check valve and said air-glycol piston accumulator.

18. The apparatus defined in claim 17, wherein said means to control said means to supply includes:
a) a three position, four way, five ported, closed center, spring centered valve in fluid communication with the inlet of said air-glycol piston accumulator and a source of pressurized air.

19. The apparatus defined in claim 18, wherein one port of said a three position, four way, five ported, closed center, spring centered valve is connected to said inlet of said air-glycol piston accumulator, another of said ports is in fluid communication with said pilot operated check valve, another of said ports is in fluid communication with a silencer, another of said ports is in fluid communication with a source of pressurized air, and the remaining port is in fluid communication with a second silencer.

20. The device defined in claim 19, wherein said base has a control pedestal mounted thereto, and said control pedestal has said three position, four way, five ported, closed center, spring centered valve mounted thereto.

21. The device defined in claim 13, wherein said expandable actuator linkage comprised a pair of scissor linkages connected at a median pivot point.

22. The device defined in claim 21, wherein each of said pair of scissor linkages includes:
   a) an outer linkage pivotally and slidably connected at its lower end to said base, and fixedly and pivotally connected at its upper end to said load platform, and
   b) an inner linkage pivotally and slidably connected at its upper end to said platform, and fixedly and pivotally connected at its lower end to said base, said inner linkage connected to said outer linkage by a median pivot means.

23. The device defined in claim 22, and further including:
   a) a roller guide fixedly mounted to said base, and
   b) a cam follower rotatably mounted to the lower end of said outer linkage and constrained for movement in said roller guide.

24. The device defined in claim 23, and further including:
   a) a roller guide fixedly mounted to said platform, and
   b) a cam follower rotatably mounted to the upper end of said inner linkage and constrained for movement in said roller guide.

25. The device defined in claim 24, and further including:
   a) an actuator linkage mounting block fixedly mounted to said platform, and
   b) a fixed pivot means connecting said upper end of said outer linkage to said actuator linkage mounting block.

26. The device defined in claim 25, and further including:
   a) an actuator linkage mounting block fixedly mounted to said base, and
   b) a fixed pivot means connecting said lower end of said inner linkage to said actuator linkage mounting block.

* * * * *